(12) United States Patent
Santoli et al.

(10) Patent No.: US 7,748,165 B2
(45) Date of Patent: Jul. 6, 2010

(54) DEVICE FOR PRODUCTION OF SEEDLINGS FROM SEEDS

(75) Inventors: Constantino Santoli, Sorens (CH); Bertrand Pittet, Cottens (CH)

(73) Assignee: Vitaseed AG, Murten (CH)

( * ) Notice: Subject to any disclaimer, the term of this patent is extended or adjusted under 35 U.S.C. 154(b) by 275 days.

(21) Appl. No.: 11/886,675

(22) PCT Filed: Nov. 15, 2005

(86) PCT No.: PCT/CH2005/000674

§ 371 (c)(1),
(2), (4) Date: Oct. 17, 2007

(87) PCT Pub. No.: WO2006/111030

PCT Pub. Date: Oct. 26, 2006

(65) Prior Publication Data
US 2009/0126267 A1 May 21, 2009

(30) Foreign Application Priority Data
Apr. 20, 2005 (EP) .................................. 05405305

(51) Int. Cl.
*A01G 31/00* (2006.01)
(52) U.S. Cl. ......................................................... 47/61
(58) Field of Classification Search ............... 47/60, 47/61
See application file for complete search history.

(56) References Cited

U.S. PATENT DOCUMENTS

| | | | | |
|---|---|---|---|---|
| 1,865,680 A | * | 7/1932 | Dax | 435/185 |
| 2,597,291 A | * | 5/1952 | Clegg | 366/208 |
| 3,911,619 A | * | 10/1975 | Dedolph | 47/14 |
| 4,642,939 A | | 2/1987 | Suzuki | |
| 4,682,613 A | * | 7/1987 | DeLoach | 134/58 R |
| 4,765,092 A | * | 8/1988 | Cline | 47/61 |
| 5,873,197 A | * | 2/1999 | Rowse et al. | 47/58.1 R |
| 6,840,007 B2 | * | 1/2005 | Leduc et al. | 47/62 C |
| 2003/0085234 A1 | * | 5/2003 | Paumen et al. | 220/912 |
| 2004/0237396 A1 | | 12/2004 | Castillo | |
| 2009/0126267 A1 | * | 5/2009 | Santoli et al. | 47/61 |

FOREIGN PATENT DOCUMENTS

| | | |
|---|---|---|
| FR | 1.099.052 | 8/1955 |
| GB | 1 382 262 | 1/1975 |
| GB | 2 163 634 A | 3/1986 |

* cited by examiner

*Primary Examiner*—Francis T Palo
(74) *Attorney, Agent, or Firm*—Oliff & Berridge, PLC (57) ABSTRACT

A device (1) for production of seedlings from seeds comprises a drum (3), with perforated walling, rotatable about the drum axis (4), disposed substantially horizontally, borne in a housing (2). In this drum (3) seeds are able to be filled, which seeds are able to be immersed in a water bath (5) together with the drum (3). For this purpose, the drum (3) rotates, whereupon the seeds and the seedlings sprouting therefrom are optimally turned and dispersed. The drum (3) is mounted on a support, which, along guide means fixed to the housing, is lowerable into the water bath (5) and liftable out of the same again by drive means. The drum (3) is thereby partly submerged in the water bath (5) in the lower position, whereas it is completely lifted out of the water bath (5) in the raised position. An optimal wetting and subsequent drying of the seeds is thus obtained in turn.

9 Claims, 9 Drawing Sheets

DEVICE FOR PRODUCTION OF SEEDLINGS FROM SEEDS

This invention relates to a device for production of seedlings from seeds, comprising a drum, supported in a housing, and disposed substantially horizontally, and rotatable about the drum axis, with perforated walling, in which the seeds are able to be filled, which seeds are able to be wet with water and which drum rotates for a predetermined time at time intervals able to be set.

Seedlings, or respectively sprouting seeds, are known to be rich in vitamins, mineral nutrients, trace elements, amino acids and biologically active substances. They are rich in enzymes which control the chemical reactions in the body. It is known that the deficiency in enzymes in nutrition can be a cause of many diseases of civilization and of old age. With sprouted seeds, the enzymes are contained therein. By chewing, the enzymes of the seedlings are released. Every seed is provided with the corresponding enzymes for its digestion.

Various devices are known for cultivation in various ways of seedlings for household use. Thus devices are known, for example, having a plurality of levels with bowls, and at each level some grams of seeds are filled, water being added twice a day at the first level, which then runs down through the lower levels and thus wets the seeds. The desired seedlings are thereby obtained in a few days. The quality of the seedlings depends substantially upon the regular and even irrigation and drainage of the bowls and thus of the seeds.

Since the fresh water is introduced in the uppermost bowl and flows down again via the lower levels, there exists the risk that the seeds or respectively seedlings in the lower levels are supplied unevenly and with water of decreasing quality. Moreover the drainage openings in the individual bowls can be blocked by the swelling seeds, thus the seedlings remain in water, which can lead to the development of molds. During the ripening process, the seedlings are not dispersed or moved. Zones of high density can thereby arise in the bowls which can be only insufficiently ventilated, whereby the seedlings begin to ferment with the residual water; moreover they become slimy.

With bowls disposed over one another in this way there is the disadvantage that an optimal quality of the end product cannot be achieved.

Devices for the industrial production of seedlings are also known. For this purpose, large rotating drums are provided in which the seeds are filled; water is injected into the drums periodically via jets as mist. Through the rotation of the seed drums during the irrigation and drainage, the seedlings are periodically turned and dispersed. A homogeneous wetting and drainage of the drum content is thereby ensured, and the partial fermentation and formation of mold is prevented.

Owing to size and type of wetting, however, these devices do not find application in households.

The object of the present invention is therefore to create a device for production of seedlings from seeds which is usable in households and with which an optimal production of seedlings can be achieved without the previously described drawbacks.

According to the invention, this object is achieved in that the drum is installed on a support, which support is lowerable and liftable, by drive means, along guide means mounted on the housing and in that a water bath is disposed in the housing in such a way that the drum is partially submerged in the water bath in the lower position, and is lifted out of the water bath completely in the raised position.

With this device, an optimal wetting of the seeds or respectively of the seedlings is achieved, the drainage is ensured through the lifting out of the water bath, the seeds and seedlings are periodically turned and dispersed in an optimal way through the rotation of the drum, whereby seedlings of consistent and high quality can be obtained.

Preferably the support is formed by two support arms running parallel, between which the drum is rotatably supported on rollers, which support arms are fixed to a holding plate that is aligned substantially perpendicular to the support arms. An optimal support of the rotatable drum is thereby obtained.

Another preferred embodiment consists in that mounted on the housing is a rear wall, which is aligned substantially perpendicular to the drum axis and along which the holding plate is displaceable with the support arms for lifting and lowering of the drum, guided by the guide means. A simple construction thereby results for being able to support the drum, guided, in a liftable and lowerable way.

Preferably a drive with corresponding gears is provided for lifting and lowering of the drum and for rotating drive of the drum. With this one drive the drum can be set in rotation and also the lifting and lowering movement of the drum can be carried out, resulting in a simple construction of the device.

A further preferred embodiment of the invention consists in that the drive comprises an electromotor which is fixed to the holding plate and drives in rotation a journal, which journal is borne in the holding plate and is connectable to the drum. Through this simple construction the drum is also able to be removed from the device and inserted again.

Preferably fixed in a torque-proof way to the journal is a further toothed wheel, which engages with a toothed rack, which is provided with a surrounding toothing on the outside, which toothed rack is held displaceable substantially horizontally in the rear wall. Through the use of this toothed rack the sequence of movement rotation-lifting-lowering of the drum by a drive is able to be achieved in a very simple way.

Preferably the lateral displacement of the toothed rack is limited on both sides by support elements. The toothed rack is thereby prevented from moving out of engagement with the further toothed wheel through too great a displacement path.

Preferably an opening in the shape of a longitudinal slot is made in the rear wall through which opening the journal protrudes. Space is thereby made in a simple way for disposing the journal driving the drum.

A further preferred embodiment of the invention consists in that the wetting cycle corresponds to a complete revolution of the further toothed wheel about the toothed rack, and is limited by an end switch which is able to be actuated by a projection mounted on the toothed rack. A very simple control thereby results for the temporal course of movement and stopping of this device.

Preferably the wetting operation is controllable by a control device which is provided with a timing element by means of which the time interval from one wetting operation to the next is able to be set. The method of operation of this device for production of seedlings from seeds is thereby optimized.

An embodiment of the invention will be more closely explained in the following with reference to the attached drawing.

Figure 1:
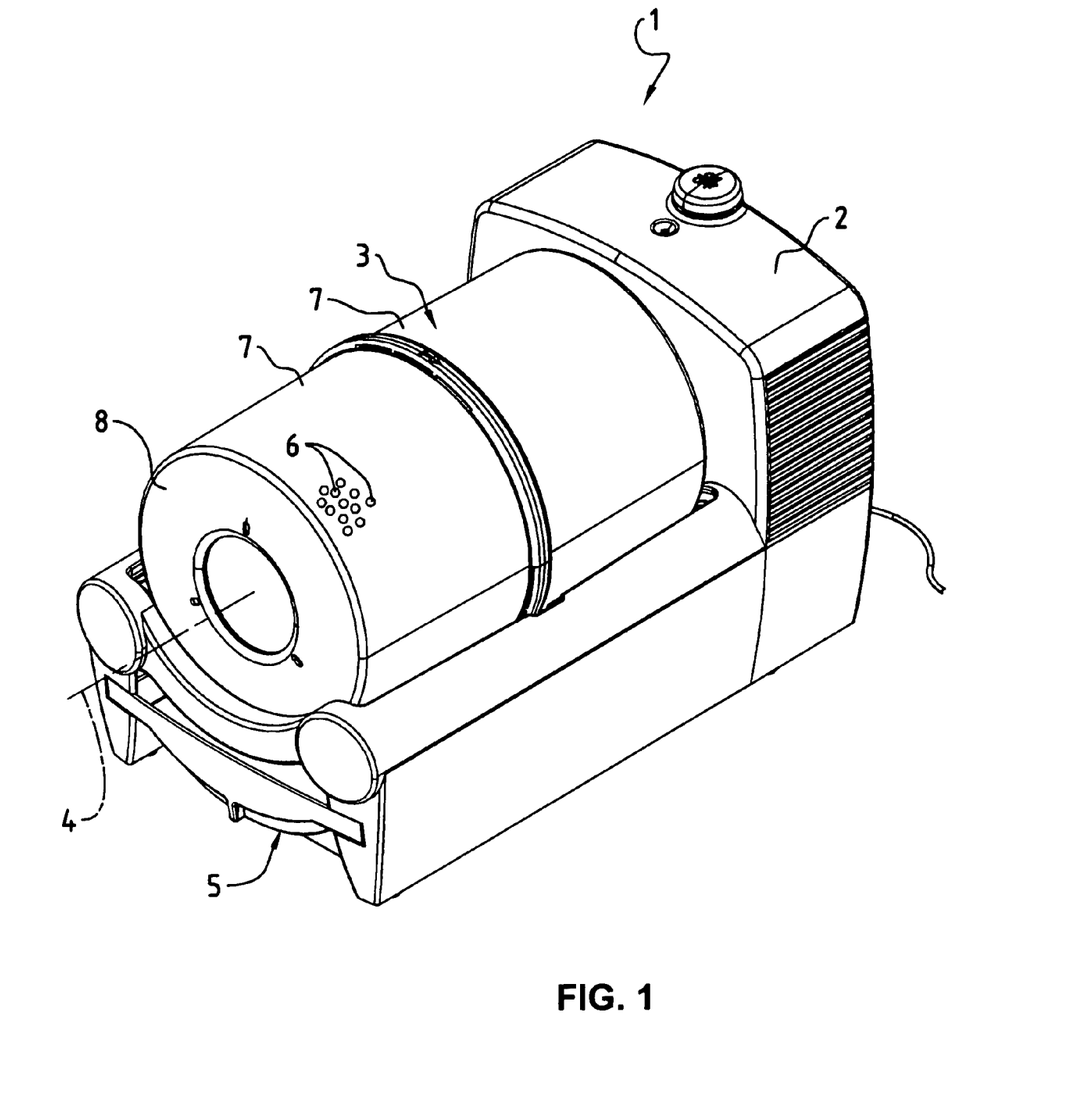
FIG. 1 shows in a three-dimensional representation the device according to the invention with the drum in raised state.

Seen in FIG. 1 is the device 1 according to the invention for production of seedlings from seeds. This device 1 is provided with a housing 2 in which the required drive device and the support for a drum 3 are accommodated, as will still be described later in detail. The drum 3 is borne such that it is rotatable about the drum axis 4. As will still be seen later, the drum 3 is lowerable in the housing 2, as can be seen from FIG. 2, so that the drum is able to be immersed in the water bath 5 disposed in the lower region of the housing 2.

As seen from FIG. 1, the drum 3 is formed by perforated sheets 7 provided with bores 6; the perforations cover practically the entire drum 3. On the front side the drum 3 is provided with an annular cover 8, which can likewise be perforated.

Figure 2:
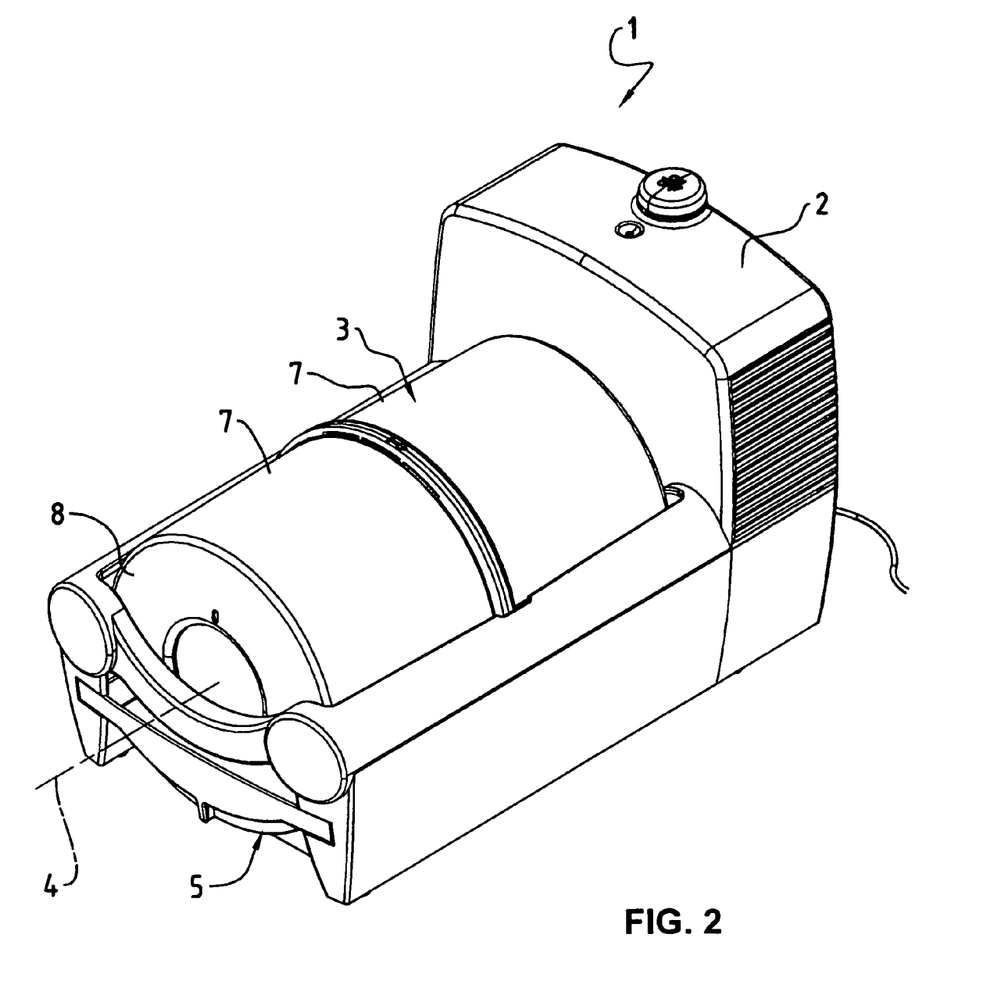
FIG. 2 shows in a three-dimensional representation the device according to the invention with the drum in lowered state.
Figure 3:
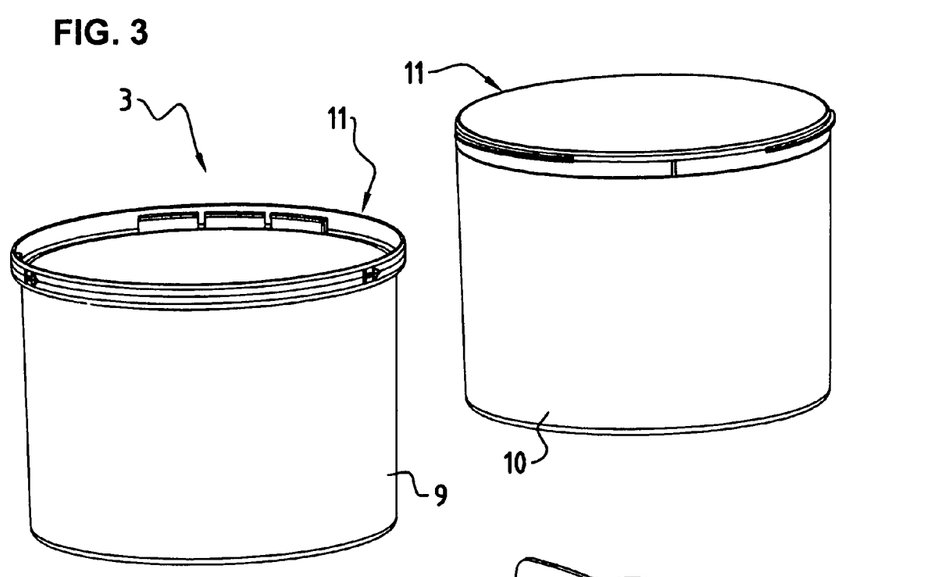
FIG. 3 shows in a three-dimensional representation a view of the drum able to be separated in the middle.

FIG. 2 shows the drum 3 in lowered state, the drum 3 is thus immersed thereby in the water bath 5. In this drum 3 the seeds can be filled which are supposed to be brought to germination. To facilitate the filling and removal of these seeds in or respectively out of the drum 3, the drum 3 is formed by two halves 9 and 10 which are detachably connected to each other in known way via the corresponding means 11. In the representation shown in FIG. 3 the perforations of the two halves 9 and 10 of the drum 3 are not drawn in. However, the two halves are of course perforated.

Figure 4:
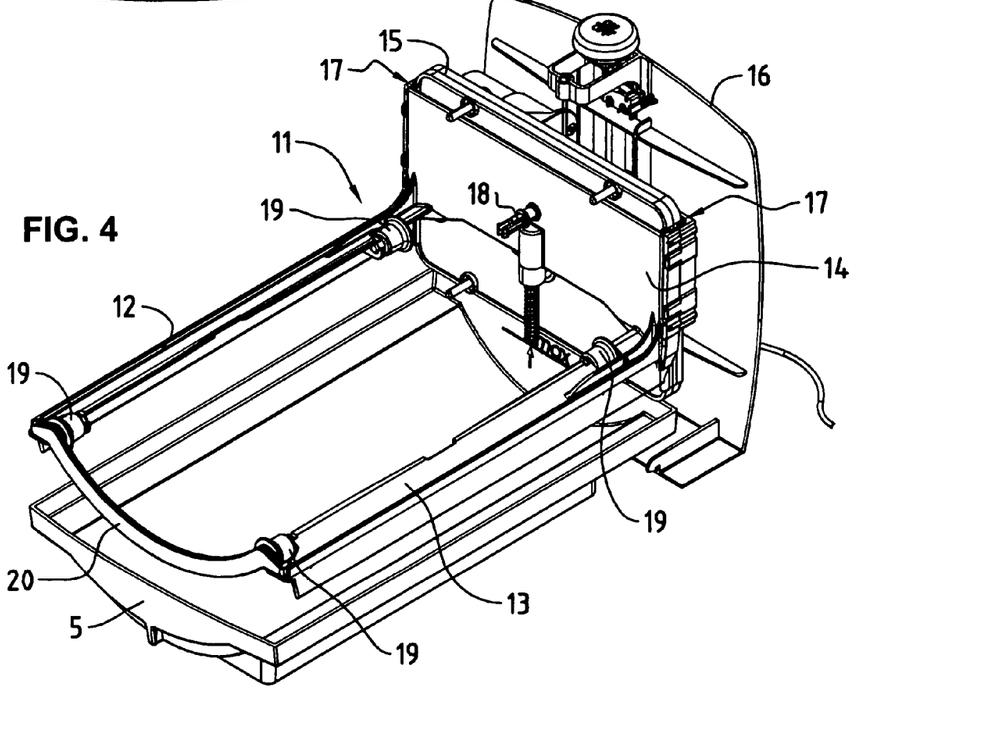
FIG. 4 shows in a three-dimensional representation the device according to the invention with housing removed and drum taken out, the support being in the raised position.

Shown in FIG. 4 is the support 11, which comprises two parallel support arms 12 and 13 which are fixed to a holding plate 14. This holding plate 14 is perpendicular to the two support arms 12 and 13. The holding plate 14, which is designed double-walled, encloses the rear wall 15, which is firmly connected to the rear part 16 and the water bath 5 fixed thereon. The rear part 16 constitutes a component of the housing 2, which is taken off in FIG. 4, as is also the drum 3 (FIG. 1 and FIG. 2). The holding plate 14 is borne displaceable along the rear wall 15, for which guide means 17 are disposed in the front, which consist in a known way of sliding surfaces (not shown). Projecting out of the holding plate 14 toward the drum side is a journal 18, which is drivable in rotation, as will still be described later in detail, and on which the drum 3 is attachable, whereby the drum 3 is drivable in rotation via this journal 18.

Mounted on the two support arms 12 and 13 are rollers 19, which are each disposed in the edge regions of these two support arms 12 and 13, so that the respective edge region of the drum 3 comes to lie on these rollers 19. For reasons of stability, the two support arms 12 and 13 are connected together via a crosspiece 20 in the region remote from the holding plate 14.

Figure 5:
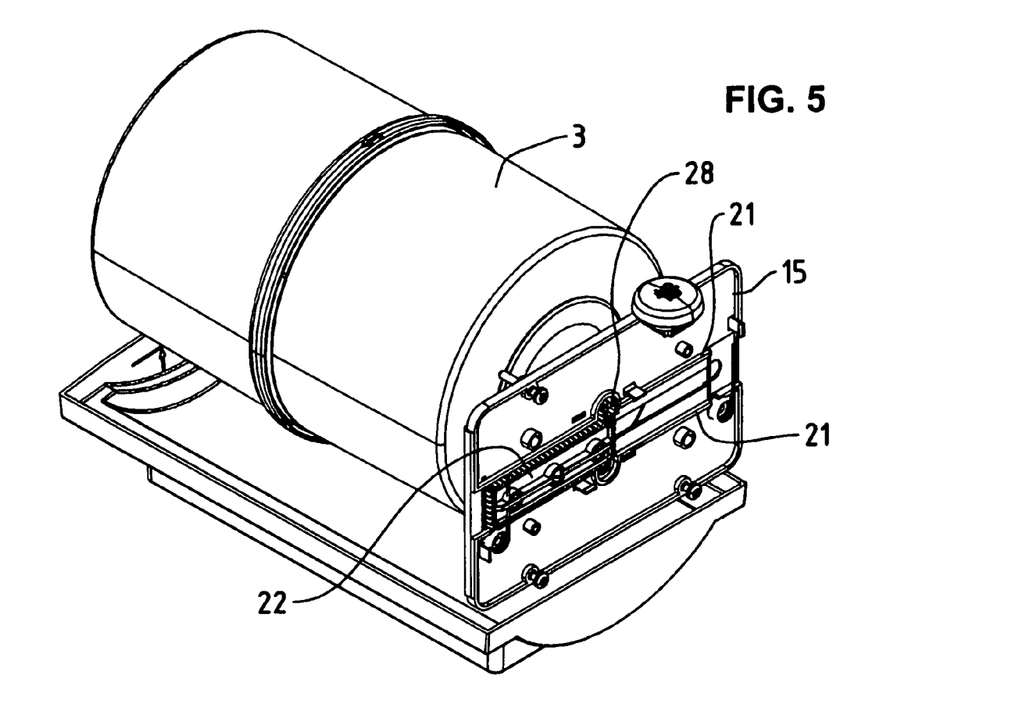
FIG. 5 shows in a three-dimensional representation a view from behind of the rear wall with displaceable toothed rack inserted therein and of the drum pushed onto the journal.

FIG. 5 shows a view of the rear side of the rear wall 15. The holding plate 14 (FIG. 4) is omitted here. The drum 3 is attached to the journal 18 (FIG. 4). Put in the rear wall 15 in the middle region are two transversely running guideways 21. Held in these guideways 21 is a toothed rack 22 displaceable along the guideways 21. This toothed rack 22 is provided on the outside with an encircling toothing, as will still be described in detail later. Engaged with the toothing of this toothed rack 22 is the further toothed wheel 28, which is put on the journal and is connected thereto in a tortionally stiff way.

Figure 6:
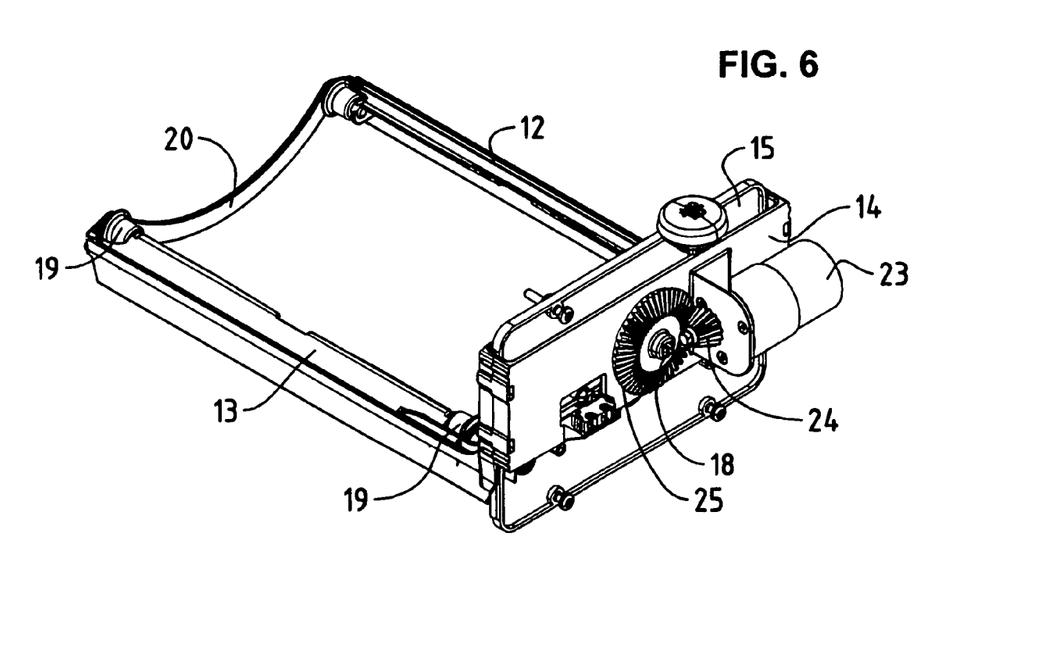
FIG. 6 shows a in three-dimensional representation a view of the support with electromotor and end switch disposed thereon.

FIG. 6 shows the rear wall 15 with attached holding plate 14 encompassing the rear wall 15. Fixed to the holding plate 14 are the two support arms 12 and 13, which are provided with the rollers 19 on which the drum is rotatably supportable. The two support arms 12 and 13 are connected together with the crosspiece 20 in the end region remote from the holding plate 14. Fixed to the holding plate 14 is an electromotor 23. Via a pinion 24 the electromotor 23 drives a toothed wheel 25, which is attached to the journal 18 and is connected to the latter in a tortionally stiff way.

Figure 7:
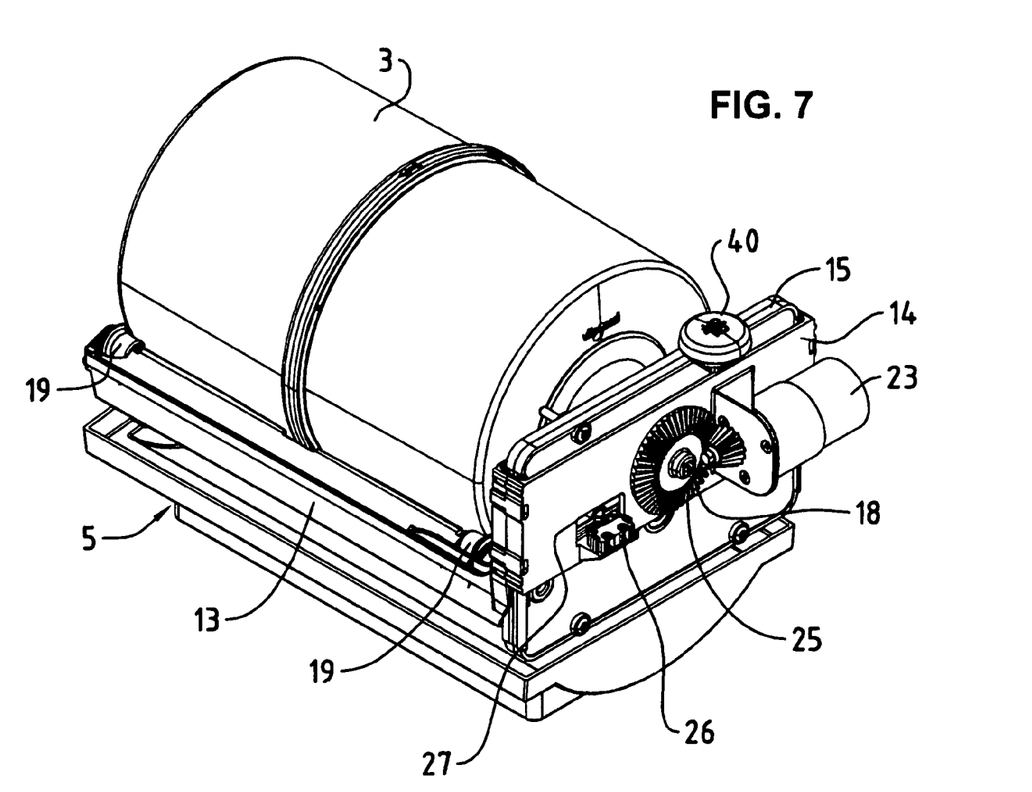
FIG. 7 shows a three-dimensional representation of the device according to the invention with the support attached to the back wall and the drum attached.

FIG. 7 shows the drum 3 put on the support arms 12 and 13, which drum is rotatably supported on the rollers 19 which are attached to the support arms 12 and 13. Also evident is the holding plate 14 which encompasses the rear wall 15. Visible under the support arms 12 and 13 and the drum 3 is the water bath 5. Drivable via the electromotor 23 is the toothed wheel 25 and with this the journal 18 on which the drum 3 is also attached. Fixed to the holding plate 14 is an end switch 26 whose sensor projects through an opening 27 in the holding plate 14, so that it co-operates with the toothed rack 22 that is transversely displaceable in the rear wall 15, as will be seen in detail later.

The operation of the device according to the invention will now be described in the following with reference to FIGS. 8 to 11. Shown in FIGS. 8 to 11 is the drum 3, which is attached on the journal 18. This journal 18 is rotatably held in the holding plate 14. The drum supports itself on the rollers 19 of the support arms 12 and 13. Likewise shown is the rear wall 15, which is provided with the guideways 21, in which the toothed rack 22 is held in a transversely displaceable way. Also shown is the water bath 5, which is filled with water.

Figure 8:
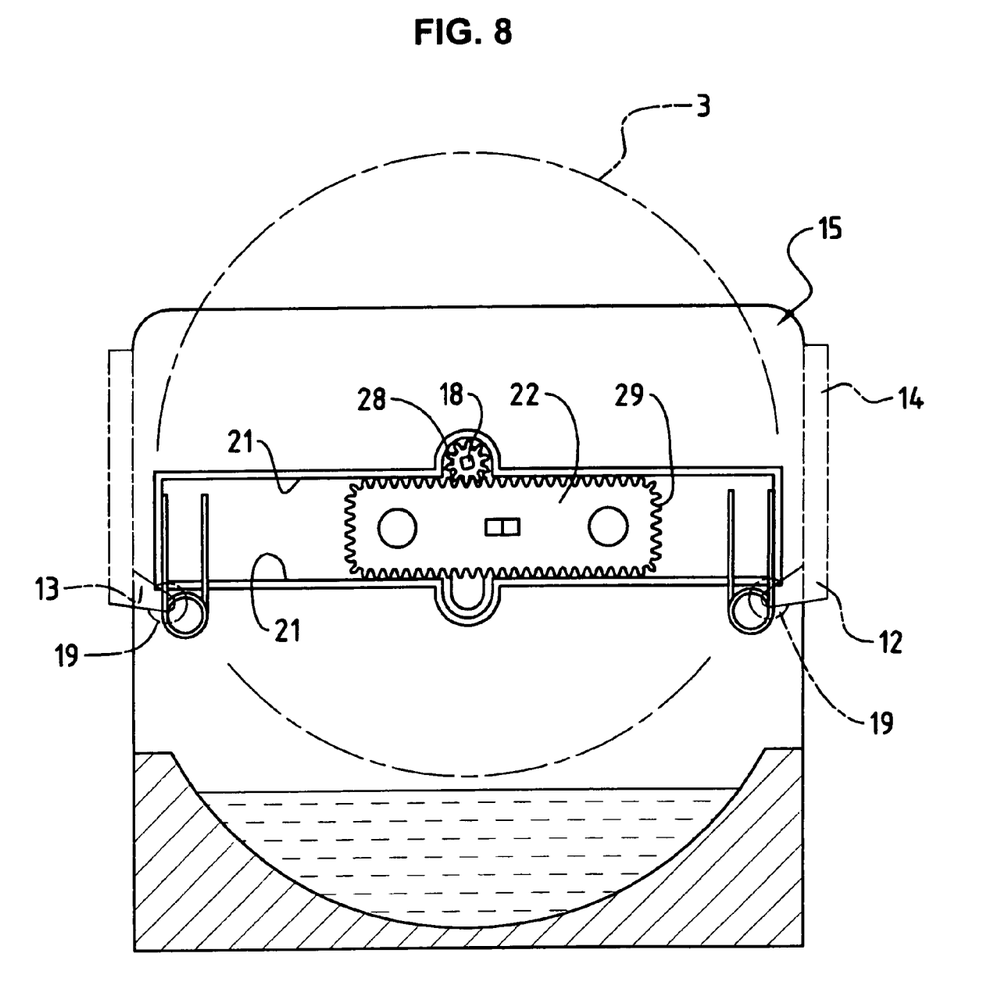
FIG. 8 shows in a diagrammatic representation the toothed rod, displaceably disposed on the rear wall, in engagement with the further toothed wheel in the starting position.

Shown in FIG. 8 is a possible starting position. The toothed rack 22 is located in a central position in the guideways 21 of the rear wall 15. The toothed wheel 28, which is put on the journal 18 and is connected thereto in a tortionally stiff way, bears on the toothed rack 22, and engages in the surrounding toothing 29 of this toothed rack 22. When starting the wetting cycle, the start button 40 (FIG. 7) is pressed, for instance, the electromotor begins to run, the journal 18, with the toothed wheel 28 fixed thereon and the drum 3, begins to turn clockwise. The turning of the journal 18 with the toothed wheel 28 causes the toothed rack 22 in FIG. 8 to be shifted toward the left in the guideways 21.

Figure 9:
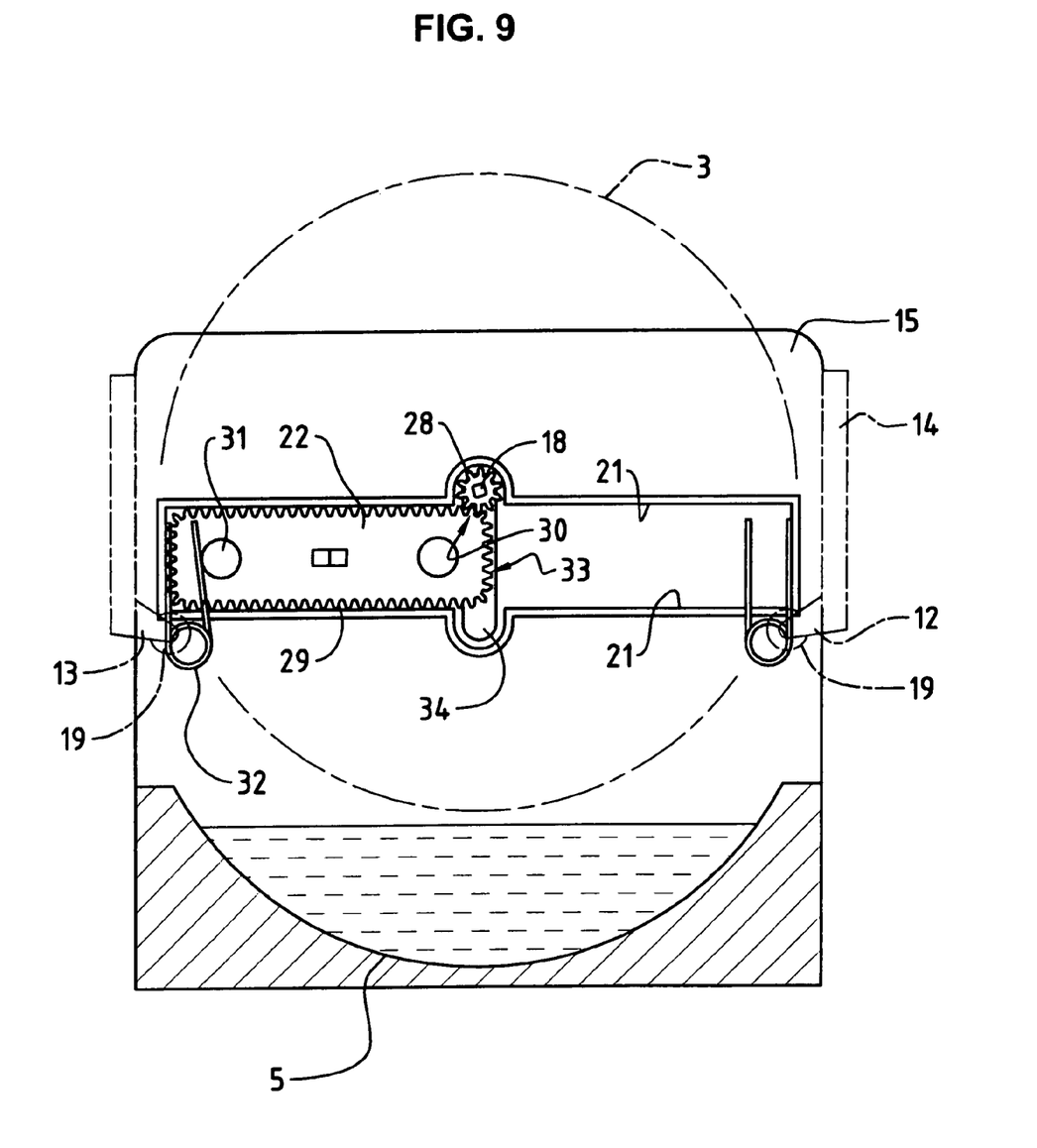
FIG. 9 shows in a diagrammatic representation the toothed rack displaced toward the left in the rear wall.

As can be seen from FIG. 9, the toothed wheel 28 reaches the corner region 30 of the toothed rack 22, which is shifted to the left in FIG. 9 and abuts, with a protrusion 31, the spring 32 installed on the rear wall 15. The toothed wheel 28 is turned further and reaches the vertical region 33 of the toothed rack 22. The toothed wheel 28 now moves through this vertical region 33; the toothed rack 22 is pressed against the toothed wheel 28 by the spring 32, so that this wheel is always in engagement with the toothing 29. During the passage through this vertical region 33 the toothed wheel 28 descends, takes along with it the holding plate 14 with the support arms 12 and 13, which bear the drum 3, and the electromotor 23 (FIG. 7) with the drive. So that this descending movement can be carried out, a slot-shaped opening 34 is made in the rear wall 15, which makes possible this descent.

Figure 10:
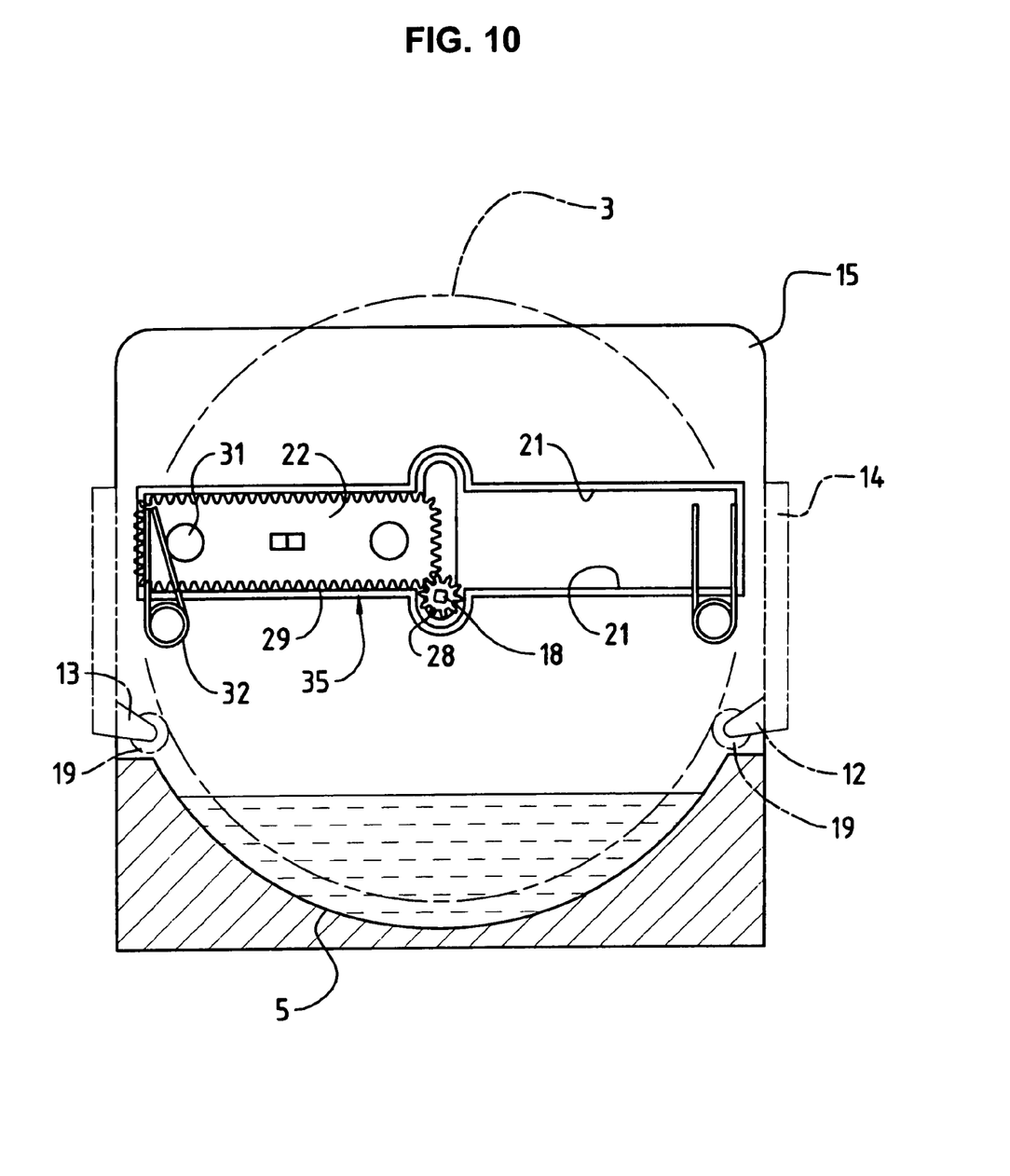
FIG. 10 shows in a diagrammatic representation the position of the further toothed wheel and of the toothed rack when the support with the drum are located in the lowered state.

The lowered position is now reached, as is shown in FIG. 10. The drum, which rotates continuously, is lowered into the water bath 5, the seeds are bathed. The toothed wheel 28 is rotated further, and thus reaches the lower region 35 of the toothed rack 22. The toothed rack 22 is now displaced toward the right side along the guideways 21. During this displacement step, the drum 3 remains in the lowered state and is immersed in the water bath 5. The drum 3 also continues to be driven in rotation, the seed and seedlings located in the drum 3 are thereby turned and completely wet.

Figure 11:
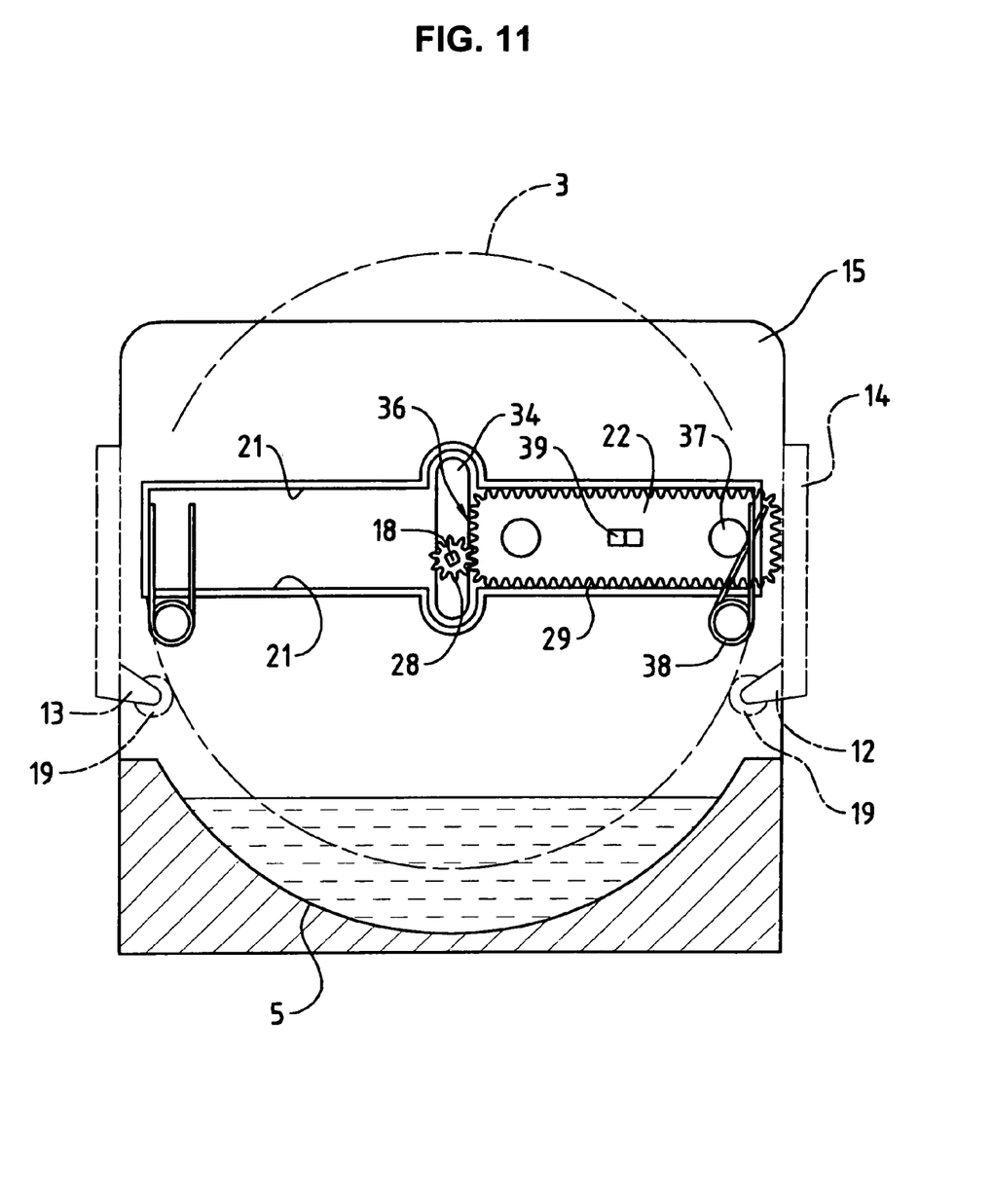
FIG. 11 shows in a diagrammatic representation the position of the toothed rack and of the further toothed wheel when the support with the drum attached are raised.

The toothed wheel 28 now reaches the right vertical region 36 of the toothed rack 22, as can be seen from FIG. 11. The toothed rack 22 is displaced completely on the right side, and supports itself with the further protrusion 37 on the spring 38, thereby causing the toothing 29 of the toothed rack 22 to be always in engagement with the toothed wheel 28. Upon reaching this vertical region 36 the toothed wheel 28 now climbs again toward the raised position, and with it the holding plate 14 with the support arms 12 and 13 and the drum 3 supported thereon, which continues to rotate. The drum 3 is thus lifted out of the water bath 5. The journal 18 hereby displaces itself upward along the slot-shaped opening 34 with all the elements hanging thereon.

The toothed wheel 18 then again reaches the upper region of the toothed rack 22, and moves back into the starting position, as is shown in FIG. 8. In this position the projection 39, which is attached to the toothed rack 22, comes into the region of the end switch 26 (FIG. 7), the latter produces a signal and causes the wetting cycle to be concluded, which means that the electromotor is switched off, the drum 3 is located in raised state, the excess water located in the drum 3, which wets the seeds and seedlings, can continue to drip down.

The next wetting operation of the seeds and seedlings can be started automatically, a timing element being used for this purpose in a known way in the known control (not shown). This timing element can be set, for example, via the switch 40 (FIG. 7) by turning. The next wetting operation is thereby automatically triggered after a predetermined time; it then runs as previously described.

Through the rotation of the drum, on the one hand when it is immersed in the water bath, on the other hand also before the immersion and after the immersion, the seedlings and seeds are turned and dispersed in an optimal way. A homogeneous wetting and drainage of the seeds and seedlings is thereby ensured. Fermentation and formation of mold is thereby prevented.

Achieved with this device is an optimal process for wetting, turning and dispersing of the seeds and the seedlings sprouting therefrom.

The invention claimed is:

1. A device for production of seedlings from seeds, comprising:
    a drum, with perforated walling, disposed substantially horizontal, rotatable about the drum axis, and supported in a housing, in which drum seeds are able to be filled, the seeds are able to be wet with water, and the drum rotates for a predetermined time at time intervals able to be set,
    wherein the drum is mounted on a support, the support is lowerable and liftable, by drive means, along guide means which are mounted on a rear wall that is attached to the housing and is aligned substantially perpendicular to the drum axis, and
    wherein a water bath is disposed in the housing such that the drum is partially submerged in the water bath in the lower position and is lifted out of the water bath completely in the lifted position.

2. The device according to claim 1, wherein the support is formed by two support arms running parallel, between which the drum is rotatably supported on rollers, the support arms are fixed to a holding plate that is aligned substantially perpendicular to the support arms and is displaceable along the rear wall.

3. The device according to claim 1, further including a drive with corresponding gears is provided for lifting and lowering of the drum and for rotating the drive of the drum.

4. The device according to claim 3, wherein the drive comprises an electromotor which is fixed to a holding plate and drives in rotation a journal, the journal is borne in the holding plate and is connectible to the drum.

5. The device according to claim 4, wherein fixed in a torque-proof way to the journal is a further toothed wheel, which engages with a toothed rack, which is provided with a surrounding toothing on the outside, the toothed rack is held displaceable substantially horizon tally in the rear wall.

6. The device according to claim 5, wherein the lateral displacement of the toothed rack is limited on both sides by support elements.

7. The device according to claim 4, further including an opening in the shape of a longitudinal slot is made in the rear wall, through which opening the journal protrudes.

8. The device according to claim 5, further including a wetting cycle, the wetting cycle corresponds to a complete revolution of the further toothed wheel about the toothed rack, and is limited by an end switch which is able to be actuated by a projection mounted on the toothed rack.

9. The device according to claim 1, wherein the wetting operation is controllable by a control device which is provided with a timing element by means of which the time interval from one wetting operation to the next is able to be set.

* * * * *